United States Patent [19]

Kuemmel

[11] Patent Number: 4,468,504

[45] Date of Patent: Aug. 28, 1984

[54] THERMOSETTING RESIN MASSES BASED UPON AMINOPLAST

[75] Inventor: Robert Kuemmel, Vaihingen, Fed. Rep. of Germany

[73] Assignee: August Krempel Soehne GmbH & Co., Stuttgart, Fed. Rep. of Germany

[21] Appl. No.: 541,470

[22] Filed: Oct. 13, 1983

[51] Int. Cl.³ .................... C08G 65/32; C08G 12/32
[52] U.S. Cl. ................................ 525/406; 525/398; 528/230; 528/254
[58] Field of Search ............... 525/398, 406; 528/230, 528/254

[56] References Cited

U.S. PATENT DOCUMENTS 3,405,076 10/1968 Green et al. .................. 528/230 X
3,728,307 4/1973 Huster ............................. 528/230
4,195,139 3/1980 Goulding et al. ............. 528/254 X Primary Examiner—Lucille M. Phynes
Attorney, Agent, or Firm—Frost & Jacobs

[57] ABSTRACT

The present invention provides a thermosetting, hardenable, flame-inhibiting and self-extinguishing resin mass based upon a conventional aminoplast or reaction resin and optionally containing a conventional cold or warm hardening system, wherein it contains melamine borate.

6 Claims, No Drawings

THERMOSETTING RESIN MASSES BASED UPON AMINOPLAST

The present invention is concerned with a thermosetting, hardenable, flame-inhibiting and self-extinguishing resin mass based on a conventional aminoplast or reaction resin which optionally contains a conventional cold or hot hardening system.

Thermosetting, hardenable resin masses are known and are used for a wide variety of purposes. They are mostly based upon aminoplasts, i.e. on urea, melamine, urethane, cyanamide, dicyandiamide, sulphonamide or aniline resins or the like, on the one hand, and formaldehyde or some other carbonyl component, on the other hand. They can also consist essentially of a reaction resin, by which is to be understood a flowable, liquid or liquefiable resin which either itself hardens or hardens with a reaction agent (hardner, accelerator or the like) by polyaddition, polycondensation or some other polymerisation reaction. The best known reaction resins include, for example, epoxide resins, phenolformaldehyde resins, unsaturated polyester resins, acrylic resins, polyester imide resins and the like. For cross-linking (hardening) these resins, there are known not only cold hardening systems but also warm hardening systems. Melamine and its derivatives, including melam, melem and melon, belong, because of their reactivity, their polyfunctionality and their relative thermal stability, to the preferred hardener systems for aminoplasts and reaction resins.

Since all of these resins are thermosetting resins which, after hardening thereof, can no longer be shaped, the storage stability and the period of workability, which in some cases is called the "pot life", depends quite decisively upon the nature and amount of the reactive resin components and the adjustment of the hardener system to the special resin types used in each case.

Thermosetting resin masses which are used for impregnating carrier strips, for example of glass, carbon or poly-p-phenylene terephthalamide fibres or combinations of such fibres, and for the production of multilayer laminates of such impregnated carrier strips and especially for the production of so-called prepregs or for the production of shaped constructional parts, must be difficultly inflammable, flame-inhibiting and self-extinguishing if they are to be used in the air and space travel industries, especially for the internal fitting out of aircraft.

The standards demanded by the national and international air authorities to which the work materials for the internal fitting out of civil aircraft must conform, for example FAR 25.853, require that the thermosetting resin masses, even in cases of fire, do not themselves burn and, in the case of thermal stressing, do not liberate any vision-hindering or toxic components, that they provide a certain heat-protective action but also have the lowest possible weight and a high degree of strength. These requirements arise from the knowledge that, especially in the case of fire catastrophes on the ground, a large part of the passengers and crew of modern large carbin aircraft can be rescued when the internal fitting out can withstand a fire even for only a few minutes.

The known thermosetting resin masses which are used for air and space travel purposes mostly contain more or less toxic inorganic compounds, such as antimony trioxide, or halogenated organic compounds, for example polybrominated diphenyls and diglycide ethers produced therefrom, as flame-protective agents. However, account must thereby be taken of the fact that of the large number of known flame-protection agents, only those compounds are suitable for thermosetting resin masses which do not react with the reactive components of the resin with cross-linking and which thus neither accelerate nor inhibit the hardening of the thermosetting resins.

It is also known to use melamine and its derivatives as flame-protection agents in dry extinguishing devices as well as for the flame-proof finishing of papers and thermoplastic textile fibres, especially of polyamide fibres and polyamide masses. Since, however, melamine, as already mentioned, is a known hardner system for thermosetting resins, its use as a flame-protection agent for precisely those thermosetting, hardenable resin masses is also excluded by the experts, as is also the use of the melamine salts also known as flame-protection agents for thermoplastic resins.

It is an object of the present invention to provide a thermosetting, hardenable, flame-inhibiting and self-extinguishing finished resin mass of the initially mentioned kind which contains a flame-protection agent which, under conditions of fire, does not liberate any toxic gases and, in particular, does not accelerate the cross-linking of the thermosetting resin, i.e. a resin mass which has an especially good storage stability and, therefore, can be used for the production of prepregs and premixes, especially for the air and space travel industries.

Thus, according to the present invention, there is provided a thermosetting, hardenable, flame-inhibiting and self-extinguishing resin mass based upon a conventional aminoplast or reaction resin and optionally containing a conventional cold or warm hardening system, wherein it contains melamine borate.

Surprisingly, we have found that melamine borate, the 1:1 acid-addition salt of melamine and boric acid, contrary to the widely held view of the experts, is an excellent flame-protection agent for thermosetting, hardenable resin masses based upon aminoplasts or reaction resins because it appears that precisely in such mixtures, even up to temperatures of more than 120° C., it remains completely undissociated and thus does not enter into any condensation or cross-linking reactions with the reactive components of the thermosetting resin masses, even though other melamine derivatives are excellent hardeners for thermosetting resin masses.

Even a per se expected catalytic hardening effect, such as occurs in the case of the preproduct dicyandiamide, was, surprisingly, not observed. Finished resin/hardner/melamine borate mixtures remain, as appropriate ageing investigations have shown, completely unchanged for several months, even at ambient temperature. However, in the case of appropriate supply of energy, hardening takes place in the same way as in the case of resin/hardner mixtures which have not been mixed with melamine borate.

Since the melamine borate used according to the present invention does not impair the hardening of the thermosetting resin masses and, in particular, does not accelerate hardening, the resin masses according to the present invention are especially suitable for the production of storage-stable prepregs and premixes for the impregnation and coating of strip-shaped carriers of all kinds but also the production of shaped bodies and laminates.

According to the definition given in German Industrial Standard DIN 65 146, Part 2, prepregs are "filament fabrics of carbon fibres which, in the state in which they are supplied, contain a definite proportion of resin mass and, without further additives, are hardenable by heat, with or without pressure". Quite generally, however, prepregs are to be understood to be all other preimpregnated planar bodies in the case of which the thermosetting resin mass is only cross-linked to a small extent but is not completely hardened so that the preimpregnated planar bodies are storage-stable and remain shapable until further worked up to give laminates, shaped bodies, fibre-reinforced constructional parts or half-finished articles.

From the prepregs or hardenable press masses (premixes) there can be produced ceiling and wall coverings, especially for the internal fitting out of aircraft, separating and intermediate walls, aircraft kitchen facilities, compartment walls, floor plates, luggage storage compartments, floor coverings, upholstery materials, decorative covering materials, artificial leather, joint and edge finishings, insulating mats, airducts, mouldings, bands, signboards, housings and containers of all kinds. These constructional parts can be produced by any desired known process from the resin masses according to the present invention, for example by cold pressing, hot pressing, injection pressing, extrusion, by fibre lapping processes and the like.

Surprisingly, we have found that in the case of the use of melamine borate as flame-protection agent, neither the mechanical, nor the thermal, nor the electrical properties of the constructional parts produced from the resin masses according to the present invention are in any way impaired.

The shaped bodies and constructional parts produced from the resin masses according to the present invention are difficultly inflammable and are self-extinguishing, in the case of flaming they do not develop any smoke, hydrocyanic acid, carbon monoxide, nitrous gases, sulphur dioxide, hydrogen halides or other toxic gases. Under the action of strong heating, as decomposition products there exclusively result steam, ammonia, carbon dioxide and boric acid (a solid material). All these decomposition products are non-inflammable flame inhibitors. Boric acid is also non-inflammable and non-volatile; furthermore, it prevents the development of smoke and acts as a heat shield. The decomposition of melamine borate is so strongly endothermal that the thermal decomposition of a test body produced from the resin masses according to the present invention ceases immediately after removal of the source of heat.

In preferred embodiments of the resin mass according to the present invention, the melamine borate content is at least 5% by volume, referred to the total volume of the mass, and preferably 15 to 25% by volume, referred to the total volume of the mass, the melamine borate preferably being present in a fine and uniformly distributed form in the resin, the storage stability of prepregs and premixes thereby being still further increased, the melamine borate preferably having an average particle size of <0.1 mm.

The above-described resin mass can, according to the present invention, be used for the production of storage-stable prepregs according to German Industrial Standard DIN 65 146, Part 2, and CFK prepregs according to Airtravel Standard LN 29971, for the impregnation and coating of filament fabrics, especially of glass, carbon and poly-p-phenylene terephthalamide fibres, as well as for the production of difficultly inflammable laminates and shaped bodies, especially for the air and space travel industries.

The following Examples are given for the purpose of illustrating the present invention:

EXAMPLE 1

In a ball mill, 100 g. of average viscosity, commercially available epoxide resin are wet ground with 30 g. melamine borate until an average particle size of 0.025 mm. has been achieved. This mixture is mixed with 5 g. fine precipitated dicyandiamide and 0.5 g. benzyldimethylaniline (hardner system).

With the so obtained resin mass there is impregnated a glass fabric in atlas binding with a weight per unit surface area of 295 g./m$^2$ in such a manner that a resin content of 50% by weight is obtained. In a laboratory drying cabinet with forced air circulation, the so impregnated fabric is partly hardened at a temperature of 120° C. up to the achievement of the B state. Thereafter, 8 layers of the so obtained prepreg are hot pressed together in the usual way in a laboratory press at 120° C. and hardened so that there is obtained a test laminate with a resin content of about 40% by weight. The test laminate is flamed and the flamed sample is extinguished about 3 seconds after removal of the source of flaming. Toxic gases as defined in FAR 25.835 cannot be detected.

EXAMPLE 2

There is produced an average viscous epoxide resin mass as described in Example 1 and this is placed into the impregnation trough of a conventional strand drawing machine. Glass rovings are passed continuously through the impregnation trough and thereby impregnated. From the impregnated glass rovings there is drawn a standard test rod and this is hardened and flamed as described in Example 1. The results of the burning test correspond completely to those of Example 1.

EXAMPLE 3

According to the process described in Example 1, there is produced a low viscous epoxide resin mass with the addition of 95 g. methylnadic anhydride and 0.5 g. benzyldimethylaniline. The mass is placed into the impregnation unit of a conventional fibre lapping machine through which glass filaments are continuously passed. A test body wound up and hardened with the use of the glass filaments impregnated with the resin mass shows a burning behaviour which is exactly the same as that of the test bodies produced according to Examples 1 and 2.

EXAMPLE 4

100 g. of commercially available unmodified polyester resin are ground with 25 g. melamine borate in a bead or ball mill until the melamine borate has an average particle size of less than 0.05 mm. The mixture is mixed with 2 g. benzoyl peroxide and 0.2 g. cobalt octoate solution, as well as with 100 g. dolomite powder, 100 g. of short pieces of glass fibre and 2.5 g. magnesium oxide. The thermosetting, hardenable resin mass so obtained is pressed in a test device at a temperature of 120° C. to give a standard body which is then subjected to the burning test described in Example 1. The burning behaviour of the standard body corresponds completely to that of the test bodies according to Examples 1 to 3.

EXAMPLE 5

100 g. of a commercially-available, liquid, average viscosity phenol-formaldehyde resin are finely ground in a wet mill with 18 g. melamine borate. A glass fibre fabric impregnated therewith is pressed in the usual way to give a test laminate at a temperature of 160° C. The burning behaviour of this test laminate also corresponds completely to that of the test bodies according to Examples 1 to 4.

EXAMPLE 6

With an epoxide resin produced according to Example 1, there are impregnated a carbon fibre fabric and an aramide fibre fabric and further treated in the manner described in Example 1. The test laminates produced therefrom display the same burning behaviour as the test bodies according to Examples 1 to 5.

I claim:

1. Thermosetting, hardenable, flame-inhibiting and self-extinguishing resin mass based upon a conventional aminoplast or reaction resin and optionally containing a conventional cold or warm hardening system, wherein it contains melamine borate.

2. Resin mass according to claim 1, wherein the melamine borate content is at least 5% by volume.

3. Resin mass according to claim 2, wherein the melamine borate content is 15 to 25% by volume.

4. Resin mass according to any of the preceding claims, wherein the melamine borate is present in the resin in a fine and uniformly distributed form.

5. Resin mass according to claim 4, wherein the melamine borate has an average particle size of <0.1 mm.

6. Use of the resin mass according to any of claims 1 to 5 for production of storage-stable prepregs according to German Industrial Standard DIN 65 146, Part 2, and CFK prepregs according to LN 29 971, for the impregnation and coating of filament fabrics, especially of glass, carbon and poly-p-phenylene terephthalamide fibres, as well as for the production of difficultly inflammable laminates and shaped bodies, especially for the air and space travel industries.

* * * * *